US009694771B1

(12) United States Patent
Ding (10) Patent No.: US 9,694,771 B1
(45) Date of Patent: Jul. 4, 2017

(54) BIOMETRIC BASED PERSONALIZED SETTINGS FOR A DRIVING APPARATUS

(71) Applicant: THUNDER POWER NEW ENERGY VEHICLE DEVELOPMENT COMPANY LIMITED, Central (HK)

(72) Inventor: Jia-Wei Ding, Tainan (TW)

(73) Assignee: THUNDER POWER NEW ENERGY VEHICLE DEVELOPMENT COMPANY LIMITED, Central (HK)

( * ) Notice: Subject to any disclaimer, the term of this patent is extended or adjusted under 35 U.S.C. 154(b) by 0 days.

(21) Appl. No.: 14/977,627

(22) Filed: Dec. 21, 2015

(51) Int. Cl.
*B60R 16/037* (2006.01)

(52) U.S. Cl.
CPC .................. *B60R 16/037* (2013.01)

(58) Field of Classification Search
CPC .. B60R 16/037; B60R 25/00; G06K 9/00006; G06K 9/00013; G06K 9/00221; G06K 9/00268; G06K 9/00362; G06K 9/00496; G06K 9/0085; G06K 9/0059
See application file for complete search history.

(56) References Cited

U.S. PATENT DOCUMENTS

2003/0204290 A1* 10/2003 Sadler ..................... B60R 25/04
701/1
2011/0090047 A1* 4/2011 Patel ..................... G07C 9/00158
340/5.82
2013/0297099 A1* 11/2013 Rovik ..................... B60R 16/037
701/2
2015/0197205 A1* 7/2015 Xiong ..................... B60R 16/037
701/49

OTHER PUBLICATIONS

Pogue, David, "iPhone" The Missing Manual, Nov. 17, 2014, O'Reilly Media, 8th Edition, Chapter 2 and Chapter 4.*

* cited by examiner

*Primary Examiner* — Sonia Gay
(74) *Attorney, Agent, or Firm* — Kilpatrick Townsend & Stockton LLP (57) ABSTRACT

A system and method for facilitating a personalizing settings in a driving apparatus using user's biometric information are provided. Individual users of an automobile are facilitated to set personal settings through a biometric information device in the driving apparatus. In one embodiment, a given user of the driving apparatus is facilitated to provide his/her fingerprint in a first mode through the fingerprint scanner to store settings of a set of currently configured components as the personalized settings for those components. The given user is facilitated to subsequently provide his/her fingerprint in a second mode through the fingerprint scanner to retrieve the personalized settings for the set of configured components and have the set of components configured in accordance with those settings. In some examples, security is provided to determine whether a given user is authorized to personalize certain customizable components in the driving apparatus.

12 Claims, 7 Drawing Sheets

BIOMETRIC BASED PERSONALIZED SETTINGS FOR A DRIVING APPARATUS

BACKGROUND

The present disclosure generally relates to configuring a driving apparatus, and more specifically to personalized configuration of a driving apparatus using user biometric information.

Automobile typically includes various components that can be adjusted manually. Examples of such adjustable components may include mirror (e.g., side-view and rear-view), seats, steering wheel, air and/or temperature control, radio station, display (e.g. lighting intensity), headlight (e.g., light always on during the day), brake, engine (e.g., economy or sports mode), or any other adjustable components in an automobile. Conventionally, an automobile with adjustable components can typically facilitate a person entering the automobile (e.g., a driver) to manually select and set his/her preferred settings for the adjustable components. For example, a female driver entering the automobile can be facilitated to adjust various levers to position the seat properly for her body type. She can also be facilitated to set the steering wheel to an angle for ease of use, adjust the rear and side-view mirrors for her height, select a favorite station on the radio, and/or select any of the additional personal settings.

Traditional automobiles require manually selecting and setting preferences of the adjustable components every time an incoming person desires a change to the setting preferences. However, the manual selection and setting described above can take a considerable amount of time. As an improvement, some automobiles allow the incoming person to adjust preferences for certain components and store the preferences for later automatic adjustment. For example, such an automobiles allows a person to set and store seat and mirror settings (e.g., seat height, legroom, recline angle, mirror angle, etc.) through a user profile of the person. For example, the incoming person can store configurations of seat and mirror to his/her profile via a wireless remote or a button within such an automobile. The person can later recall the seat and mirror settings via the key or the button when he/she enters the automobile.

One drawback of the aforementioned conventional automatic technique is that the user profile of the person is typically stored in a memory device in the automobile, which is powered by a battery of the automobile; and once the battery is drained, the settings for the persons is lost and requires that person to store those settings again by adjusting the seat again. Another drawback of the conventional technique is that the number of users that can have preferred settings is limited. Typically no more than four users can have their own preferred settings for the automobile. If there are more than four people that use the automobile regularly, some or all of those people are required to readjust the components manually when they enter the conventional automobile.

Yet another drawback of the conventional technique is that it does not allow different users of the automobile to set and store preferences for different sets of the customizable components. That is, although different users can be facilitated through different user profiles by the conventional technique, each user profile contains configuration information for the same components (e.g., mirror and seat). Thus, the individual users of the automobile cannot be associated with different components under the conventional technique.

Still another drawback of the conventional technique is that it lacks measures to ensure the settings are recalled and/or updated by the same person that set those settings. For example, the conventional technique does not really identify whether a user is a child, so it does not prevent a child from adjusting and storing the settings of the adjustable components in the automobile and thus could cause inconvenience to the adults that use the automobile. Sometimes mistakes can also happen under the conventional technique such that an incoming person can press a wrong button to recall pre-stored settings for another user of the automobile.

Therefore, it is desirable to provide new systems and methods for facilitate personalized configuration of components in an automobile.

BRIEF SUMMARY

Embodiments can provide systems and methods for configuring customizable components in a driving apparatus based on user biometric information. Each of multiple users of the driving apparatus can be facilitated to set and store his/her own personalized settings for a set of customizable components associated with the user by providing his/her biometric information. In one embodiment, without limitation, the individual users are facilitated to do so through a fingerprint scanner within the driving apparatus. In that embodiment, a given user of the driving apparatus is facilitated to provide his/her fingerprint in a first mode (e.g., a long touch) through the fingerprint scanner to store settings of a set of currently configured components as the personalized settings for those components. The given user is facilitated to subsequently provide his/her fingerprint in a second mode (e.g., a short touch) through the fingerprint scanner to retrieve the personalized settings for the set of configured components and have the set of components configured in accordance with those settings. In this way, each of the multiple users of the driving apparatus can be facilitated to store and automatically recall personalized settings for a set of customizable components associated with the user. Compared with the conventional technique described above, there is no user limit under this approach—any number of users can be facilitated to have his/her personalized settings for the customized components in the driving apparatus.

In some examples, different sets of customizable components can be associated with different users of the driving apparatus through their biometric information. For example, a driver of the driving apparatus can be facilitated to store and automatically recall his/her personalized settings for the steering wheel, display light intensity on the dashboard, mirror angles, while one or more passengers may not store, retrieve and/or update settings for these components. In some examples, different user biometric information capturing devices can be provided in the driving apparatus, for instance, one for the driver(s) and one for the passenger(s). Compared with the conventional automatic adjustment technique described above, this facilitates personalized settings on a component level—i.e., different users can have different components customized—rather than on a user level as facilitated by the conventional technique described above.

In some examples, security is provided to determine whether a given user is authorized to personalize certain customizable components in the driving apparatus. For example, a child user of the driving apparatus may be prevented from personalizing certain driving features or safety features of the driving apparatus. As another example, the child user may be limited to customizing only a subset of the components in the driving apparatus. For instance, upon biometric information regarding the child user is received, configurations for certain components (e.g., such as mirror angles, steering wheel configurations, driving mode, brake mode, and/or any other driving features provided by the driving apparatus) can be disabled.

In some examples, a system for facilitating personalized components in multiple driving apparatuses is provided. The system may comprise one or more servers configured to communicate with the multiple driving apparatuses. The server(s) may comprise a user management component configured to manage user information for the multiple driving apparatus. The user information may include information regarding configurations of particular components of the multiple driving apparatuses for the different users. For example, without limitation, configurations of a first set of components in a first driving apparatus may be managed for a first user for the first driving apparatus; configurations of a second set of components in a first driving apparatus may be managed for a second user for the first driving apparatus; configurations of a third set of components in a second driving apparatus may be managed for the first user for the second driving apparatus; and so on. In those examples, the individual driving apparatuses can be configured to communicate user biometric information with the server(s) over a network.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The detailed description is set forth with reference to the accompanying figures. In the figures, the left-most digit(s) of a reference number identifies the Figure in which the reference number first appears. The use of the same reference numbers in different Figures indicates similar or identical items.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
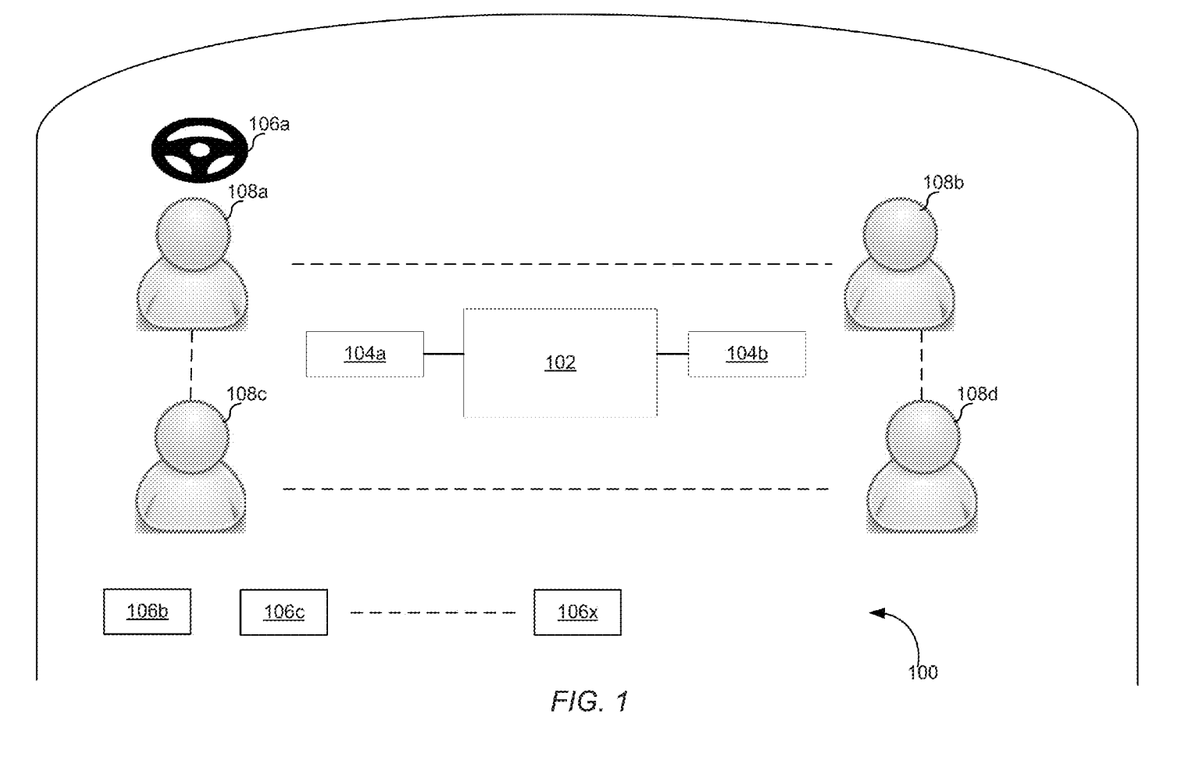
FIG. 1 is a diagram generally illustrating a driving apparatus in accordance with the disclosure.

In accordance with the disclosure, personalized settings of customizable components in a driving apparatus can be facilitated. Biometrics, such as fingerprint, retina pattern, voice pattern and/or any other biometrics of a given user of the driving apparatus, can be captured to identify the given user. The given user can be associated with a set of customizable components such that the given user may configure and store the settings of these customizable components as personalized settings, and retrieve or update the personalized settings later for automatically adjusting these components. FIG. 1 illustrates one example of a driving apparatus 100 that allows a user to provide his/her biometric information to store, retrieve, and/or update the personalized settings described above.

As shown, driving apparatus 100 in accordance with the disclosure may include a processor 102 configured to execute machine-readable instructions. The machine-readable instructions, when executed, can cause process 102 to perform one or more operations to implement storing, recalling and/or updating the personalized settings of customizable components in the driving apparatus 100. As shown, processor 102 may be operatively connected to one or more biometric information capturing devices 104, such as the biometric capturing devices 104a-b shown in this example. The biometric information capturing device 104 can be configured to acquire biometric information from a user of the driving apparatus 100. In some examples, the biometric information capturing device 104 may be configured to identify the user based on the biometric information provided by the user. However, this is not necessarily the only case. In some examples, the biometric information capturing device 104 may not identify the user. In those examples, the biometric information capturing device 104 may be configured to simply transmit the captured user biometric information to processor 102 for further processing.

As shown, driving apparatus 100 can comprise customizable components 106. Some customizable components 106 in the driving apparatus 100 may have one or more settings that can define corresponding modes of operations for those customizable components 106. Examples of those customizable components 106 may include driving mode of an engine of driving apparatus 100 (e.g., sports or economy mode), automatic headlight mode (e.g., daytime running mode, tunnel light mode), light intensity on dashboard display(s), airbag mode, cruise control, camera mode and/or another components that can be customized to operate in a particular mode for a given user of the driving apparatus 100.

Some customizable components 106 in the driving apparatus 100 may have one or more settings that can define a position and/or an operational angle of those components. Examples of such customizable components 106 may include one or more seats (front and/or rear), one or more seat belts, one or more mirrors, a steering wheel, one or more windows and accessories thereto, and/or any other customizable components whose position(s) or angle(s) can be adjusted.

Some customizable components 106 in the driving apparatus 100 may have one or more settings that can define a starting point of the customizable components. Examples of such components may include a radio (e.g., start station, start volume, etc.), a navigation system (e.g., language, voice guide volume, voice guide accent), climate control (e.g., start temperature, wind strength, wind direction, humidity, and so on), an entertainment system (e.g., personalized start screen for a particular passenger), and/or any other customizable components 106 that has a configurable initial state of operation. Other examples of customizable components 106 are contemplated.

As still shown, driving apparatus 100 can facilitate multiple users 108 to personalize their settings of the customizable components 106. The users may include one or more drivers of the driving apparatus 100 and/or one or more passengers of the driving apparatus 100. As mentioned above, separate biometric information capturing devices 104 can be provided to different types of users of driving apparatus 100. For example, without limitation, the biometric information capturing device 104a can be provided to the driver(s) of the driving apparatus 100 for storing, recalling, and/or updating the personalized settings of customizable components 106 associated with the driver(s); and the biometric information capturing device 104b can be provided to the passenger(s) of the driving apparatus 100 for storing, recalling, and/or updating personalized settings of the customizable components 106 associated with the passenger(s).

It should be understood driving apparatus 100 in accordance with this disclosure is not necessarily limited to an automobile. Other types of driving apparatus 100 are contemplated. For example, the driving apparatus 100 can be a train, a bus, a vessel, a motorcycle, an electronic bike, a rocket ship, an airplane, and/or any other types of apparatus that can move in distance.

Figure 2:
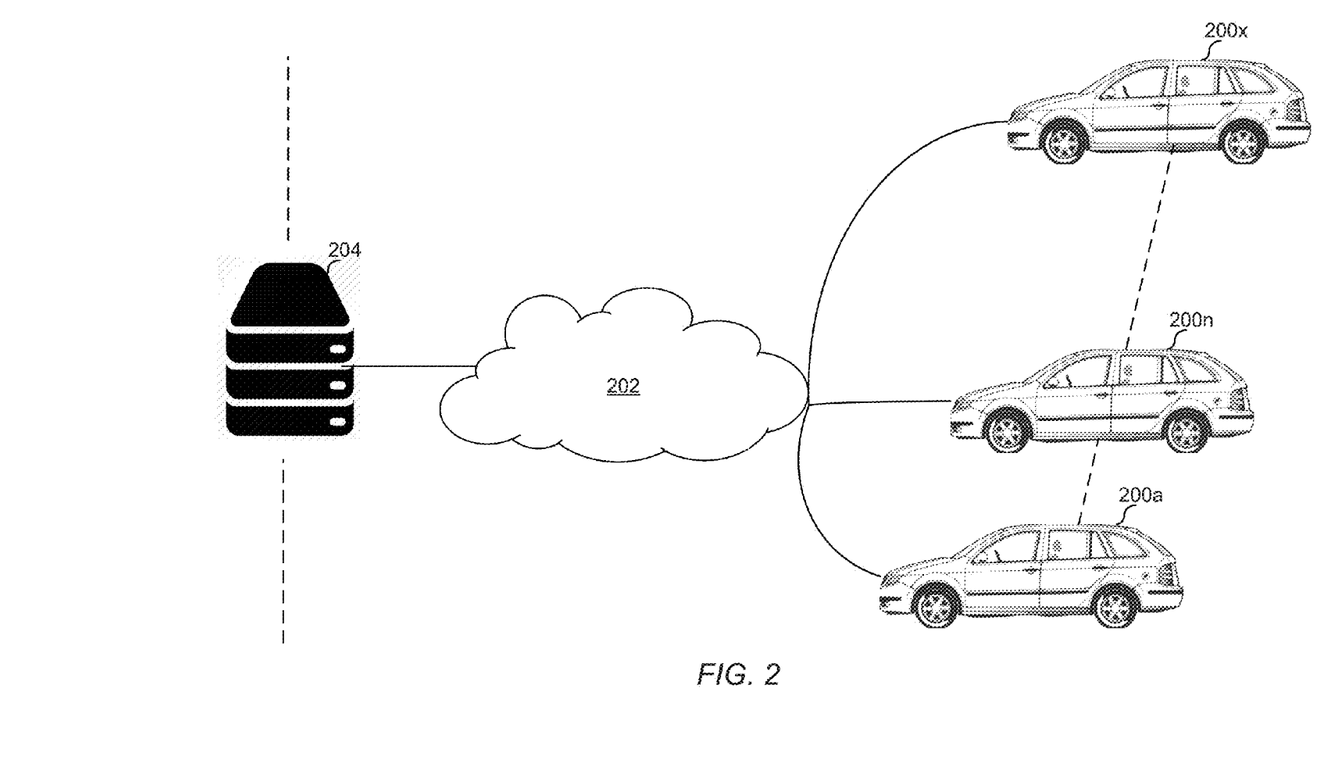
FIG. 2 is a diagram generally illustrating an infrastructure for facilitating users to personalize settings of components of a plurality of driving apparatuses in accordance with one example of the disclosure.

FIG. 2 is a diagram generally illustrating an infrastructure for facilitating users to personalize settings of components in a plurality of driving apparatuses in accordance with one example of the disclosure. As shown, in some examples, as in this example, one or more servers 204 can be provided to communicate with the multiple driving apparatuses, such as driving apparatus 200a-x shown. In those examples, a given driving apparatus 200, such as driving apparatus 202a, can store, retrieve, and/or update settings of customizable components for one or more users of the given apparatus 200 by communicating with the server 204 via a network 202. The network 202 may comprise wired and/or wireless connections. The server 204 may be configured to manage the users of the driving apparatuses 200a-x, to manage component configuration information regarding the components of the driving apparatuses 200a-x for the users, and/or to perform any other operations.

Figure 3:
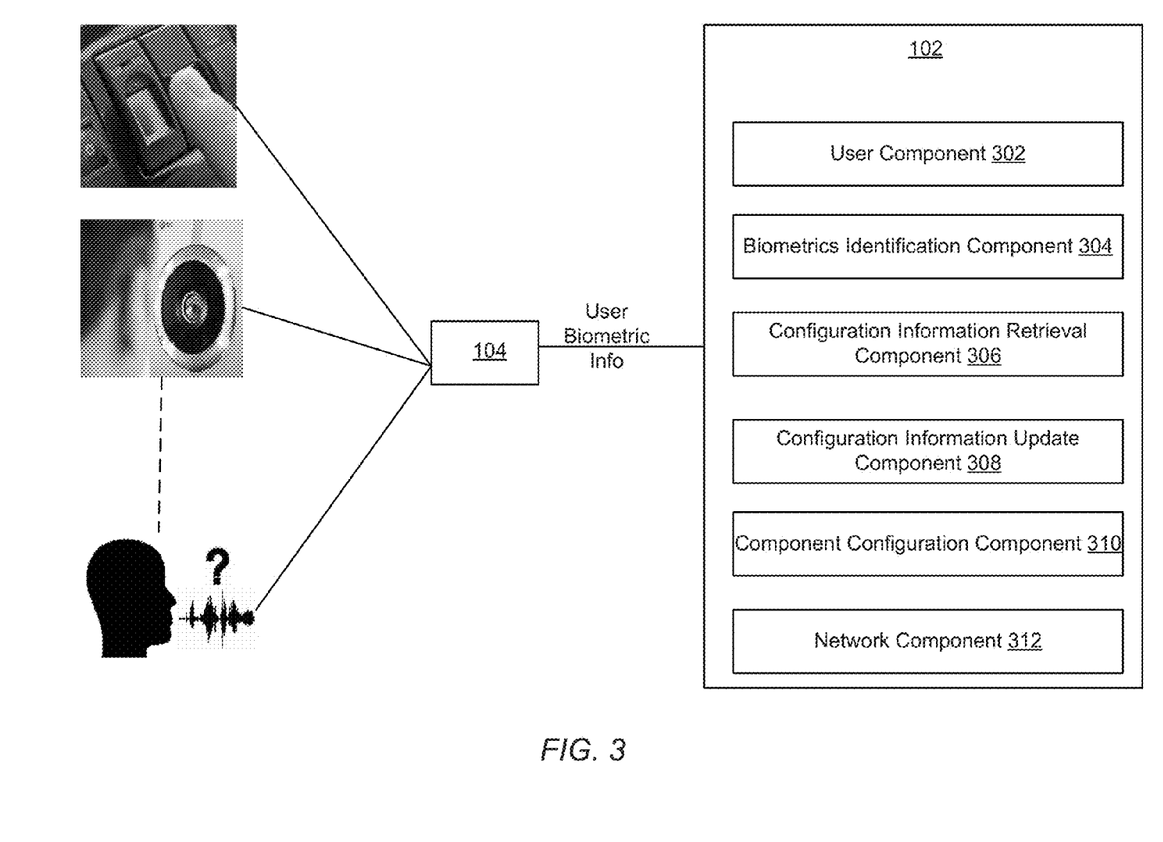
FIG. 3 is a block diagram illustrating an exemplary implementation for facilitating biometrics based personalized settings in a driving apparatus in accordance with the disclosure.
Figure 4:
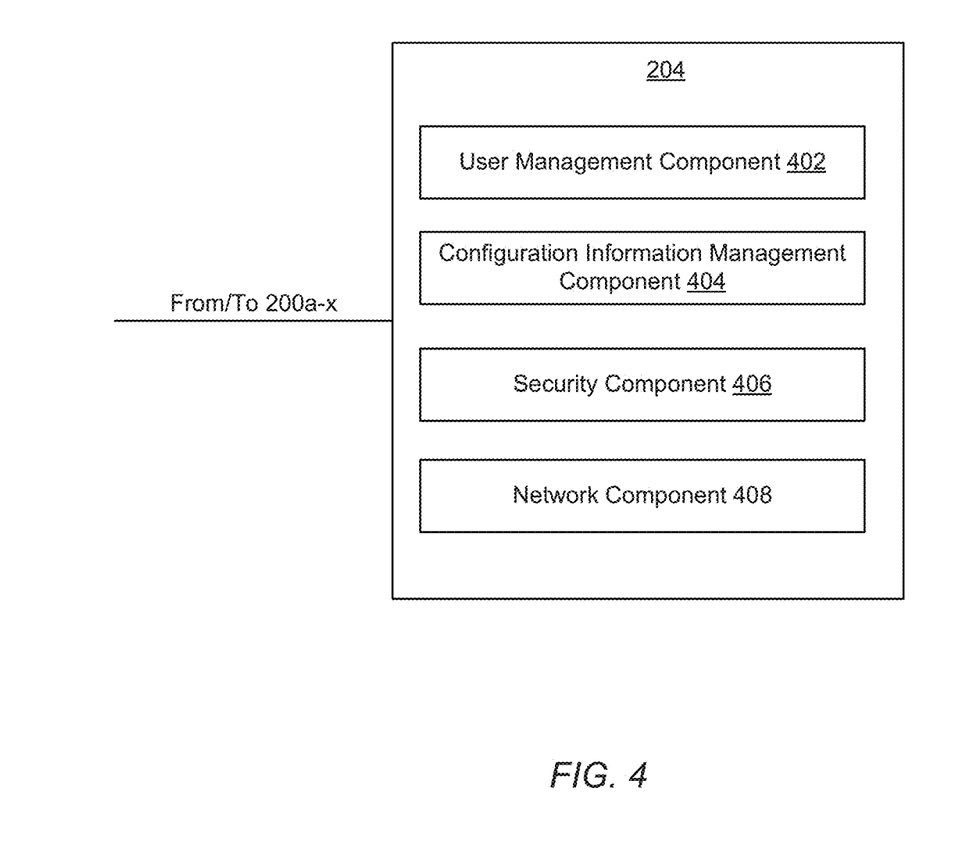
FIG. 4 is a block diagram illustrating an exemplary implementation of the server shown in FIG. 2.

With the apparatus 100 and an exemplary infrastructure for facilitating users to personalize settings of components of the driving apparatus 100 having been generally described and illustrated, attention is now directed to FIG. 3 and FIG. 4 where exemplary implementations of process 102 shown in FIG. 1 and the server 204 shown in FIG. 2 are provided. They will be described with reference to FIGS. 1 and 2. As shown in FIG. 3, the biometric information capturing device 104 may be configured to capture biometric information regarding a user of the driving apparatus 100. As shown, the captured biometric information can include information regarding a fingerprint of the user, a retina pattern of the user, a voice pattern of the user, a facial feature of the user and/or any other biometric information regarding the user. As shown, in some examples, the biometric information capturing device 104 may include a fingerprint scanner configured to capture fingerprint information regarding the user; in some examples, the biometric information capturing device 104 may include an eye scanner configured to capture a retina pattern of the user of the driving apparatus 100; and in some examples, the biometric information capturing device 104 may include a voice recognition device configured to capture a voice pattern of the user of the driving apparatus 100. Other examples of the biometric information capturing device 104 are contemplated. For instance, the biometric information capturing device 104 can include a camera configured to capture a facial image of the user.

As shown in this example, the user biometric information captured by the biometric information capturing device 104 can be transmitted to the processor 102 for further processing. As shown in this exemplary implementation, processor 102 can include a user component 302, a biometric identification component 304, a configuration information retrieval component 306, a configuration information update component 308, a component configuration component 310, a network component 312, and/or any other components.

User component 302 can be configured to manage users of the driving apparatus 100. Managing users of the driving apparatus 100 by the user component 302 may include storing, retrieving, updating, and/or removing user information regarding a particular user of the driving apparatus 100. The user information regarding the particular user managed by the driving apparatus 100 can include information indicating a user profile associated with the particular user. The user profile can include various configurations of a set of customizable components associated with the particular user. For example, the configurations may include personalized settings one or more seats (front and/or rear), one or more seat belts, one or more mirrors, a steering wheel, one or more windows, driving mode of an engine of driving apparatus 100 (e.g., sports or economy mode), automatic headlight mode (e.g., daytime running mode, tunnel light mode), light intensity on dashboard display(s), airbag mode, cruise control, camera mode, a radio (e.g., start station when the driving apparatus 100 is on, start volume), a navigation system (e.g., language, voice guide volume, voice guide accent), climate control (e.g., personalized start temperature, wind strength, wind direction, humidity, and so on), an entertainment system (e.g., personalized start screen for a particular passenger), and/or any other customizable components in the driving apparatus 100.

In some examples, the user profiles managed by the user component 302 may specify different sets of customizable components for different users of the driving apparatus 100. For example, a user profile for a first user of the driving apparatus 100 (e.g., an owner of the driving apparatus 100) may specify personalized settings for a first set of customizable components that include mirrors and driver's seat; and a user profile for a second user of the driving apparatus 100 (e.g., a child of the owner of the driving apparatus 100) may specify a personalized settings for an entertainment system within the driving apparatus 100, but may not specify personalized settings for the mirrors and driver's seat. That is, the set of customizable components specified for the first and second users of the driving apparatus 100 can be different by at least one customizable component. However, it should be appreciated it is contemplated that for some users of the driving apparatus 100, the same set of customizable components can be associated with them. For example, there can be two or more drivers for the driving apparatus 100 and they can be associated with the same customizable components.

In some examples, user profiles managed by the user component 302 may comprise verified biometric information regarding the users of the driving apparatus 100. For example, a user profile for a particular user may comprise fingerprint, voice pattern, retina, blood characteristics, one or more facial feature, height, weight, and or any other verified biometric information regarding the particular user. The verified biometric information may be provided by the particular user during a configuration time of the driving apparatus 100 for the particular user. For example, the particular user may present a password and have the biometric information capturing device 104 read his/her fingerprint and store it as the verified biometric information regarding the particular user.

In some examples, the user component 302 may manage aforementioned user information regarding the users of the driving apparatus 100 via a local storage within the driving apparatus 100. As illustration, the storage in those examples can be configured to store user information regarding the users of the driving apparatus 100 via a user database or a user file. However, it should be understood this is not necessarily the only case. In some examples, the user component 302 may manage aforementioned user information regarding the users of driving apparatus 100 via a remote server, such as the server 204 shown in FIG. 2. In those examples, user component 302 can be configured to store, retrieve and/or update the user information regarding the particular user by initiating requests to the server 204.

Biometric identification component 304 may be configured to receive biometric information from the biometric information capturing device 104 and make a user identification based on the received biometric information. In implementations, the biometric identification component 304 may make the user identification by obtaining the verified biometric information regarding the users of driving apparatus 100 from the user component 302. Making the user identification based on the user biometric information may involve analyzing a pattern or patterns in the biometric information received from biometric information capturing device 104 and matching the pattern(s) to verified biometric information regarding a particular user.

Configuration information retrieval component 306 may be configured to retrieve component configuration information for the particular user as identified by the biometric identification component 304. The configuration information retrieval component 306 may retrieve the component configuration information for the particular user through the user component 302. For example, as illustration, the configuration information retrieval component 306 may present an user ID of the particular user to the user component 302 so that user component 302 can locate the user profile of the particular user and extract component configuration information from the user profile.

In some examples, the configuration information retrieval component 306 may be configured to retrieve the component configuration information for the particular user from a remote server, such as the remote server 204. In those examples, the configuration information retrieval component 306 may be configured to generate a request with a user ID of the particular user and transmit the request to the remote server via the network 202.

Configuration information update component 308 can be configured to update component configuration information for a particular user identified by the biometric identification component 304. The configuration information update component 308 may update the component configuration information for the particular user through the user component 302. For example, as illustration, the configuration information update component 308 may present a user ID of the particular user to the user component 302 so that user component 302 can locate the user profile of the particular user. In some examples, the configuration information update component 308 may be configured to capture various settings of the set of customizable components associated with the particular user after receiving an indication from the particular user indicating the settings for the set of customizable components to be updated. For example, the particular user may be facilitated to provide a long touch of his fingerprint through a fingerprint scanner 104 indicating that the particular user would like to update the stored personalized settings of the set of customizable components associated with the particular user as they are currently configured. As another example, a mode control such as an update button on a touch screen of the biometric information capturing device 104 can be provided to enable the particular user to update the stored personalized settings. Other examples are contemplated.

In some examples, the configuration information update component 308 may be configured to update the component configuration information for the particular user from a remote server, such as the remote server 204. In those examples, the configuration information update component 308 may be configured to generate a request with a user ID of the particular user and transmit the request to the remote server via the network 202.

Component configuration component 310 may be configured to effectuate configurations of customizable components in accordance with the configuration information retrieved by the configuration information retrieval component 306 for the particular user. Effectuating the customizable components by the component configuration component 310 may involve generating control signals and/or instructions for each of the customizable components indicated in the component configuration information retrieved by configuration information retrieval component 306. Upon receiving the control signal(s) and/or the instructions, the individual customizable components may be adjusted accordingly.

In some examples, as in this example, the processor 102 may comprise a network component 312. The network component 312 may be configured to facilitate remote communications between the driving apparatus 100 and the server(s) 204. Facilitating the remote communications by the network component 312 may include manage remote connections with the server(s) 204. In one example, the connections between the driving apparatus 100 and the server(s) 204 are via a cellular network 202. In another example, the connections between the driving apparatus 100 and the server(s) 204 are via satellite.

FIG. 4 is a block diagram illustrating an exemplary implementation of server 204. In the example shown in FIG. 4, server 204 comprises a user management component 402, a configuration information management component 404, a security component 406, a security component 408, and/or any other components. The user management component 402 can be configured to manage users of multiple driving apparatuses, such as the driving apparatus 200a-x shown in FIG. 2. A particular user and a particular driving apparatus 200 can be managed by the user management component 402 by mapping the particular user to the particular driving apparatus 200. It should be appreciated that the particular user can be mapped to one or more driving apparatuses 200. For example, the particular user may be an owner of a first driving apparatus, an authorized driver of a second driving apparatus, a passenger of a third driving apparatus, and so on. In that example, the user management component 402 may map the user to the first, second and third driving apparatuses. It should also be appreciated that the particular driving apparatus can have one or more users. For example, the particular driving apparatus can have a first user as the owner, a second user as an authorized driver, a third user as a passenger, and so on. In implementations, a user table may be implemented for the users such that each record in the user table is mapped to a corresponding driving apparatus in a driving apparatus table.

The configuration information management component 404 may be configured to manage component configuration information for individual users of the driving apparatus 100. Managing the component configuration information for a particular user by the configuration information management component 404 may involve managing configuration information for various components for the particular user. For example, for a first user, a set of customizable components can be managed such that the first user is enabled to use the configurations for these customizable components for the one or more driving apparatuses associated with the first user. As illustration, the configuration information management component 404 may manage a first set of customizable components for the first user including rear-view mirror and seat configuration. The first user can be mapped to the first and a second driving apparatuses 200 in that example, and the first user may be enabled to set and store personalized settings for rear-view mirror and seat configuration through the first driving apparatus as described herein. The first user in that example can then be enabled to replicate the personalized settings of the rear-mirror and seat to the second driving apparatus. For example, as illustration, the first user can retrieve the personalized settings for the rear-view mirror and the seat by presenting his/her biometric information in the second driving apparatus, which may be then transmitted to server 204. In response to receiving the user biometric ID at server 204, the configuration information management component 404 may consult the user management component 402 and determine that the first user is also mapped to the first driving apparatus. Upon this determination, the configuration information management component 404 may determine which customizable component(s) associated with the first user can be commonly configured in the first and second driving apparatus. For instance, the rear-mirror and seat in the first and second driving apparatuses may be configured the same way as or similarly. In implementations, a configuration table may be managed by configuration information management component 404 for each user. Each record in the configuration table may specify a personalized setting for a corresponding customizable component.

The security component 406 may be configured to authenticate and/or filter user access to the user information managed by user management component 402 and/or the component information managed by the configuration information management component 404. Operations provided by security component 406 may involve determining whether a particular user is authorized to access the user information and/or component configuration information. For example, in response to the first user's request to update configuration for a set of customizable components in the first driving apparatus, the security component 406 may determine if the first user has a permission to update these customizable components. In the event that the first user does not have the permission to update, the security component 406 may deny the update request from the first user. In some examples, the security determination by the security component 406 may be on a user basis. For example, a set of privileges associated with a given user of a driving apparatus may be predetermined by a power user of the driving apparatus (e.g., an owner), an administrator of sever 204, a manufacturer of the driving apparatus, and/or any other entities related to the driving apparatus. As illustration, the owner of the driving apparatus may be enabled to specify which users can have access to certain customizable components, and which users cannot have access to those customizable components.

Figure 5:
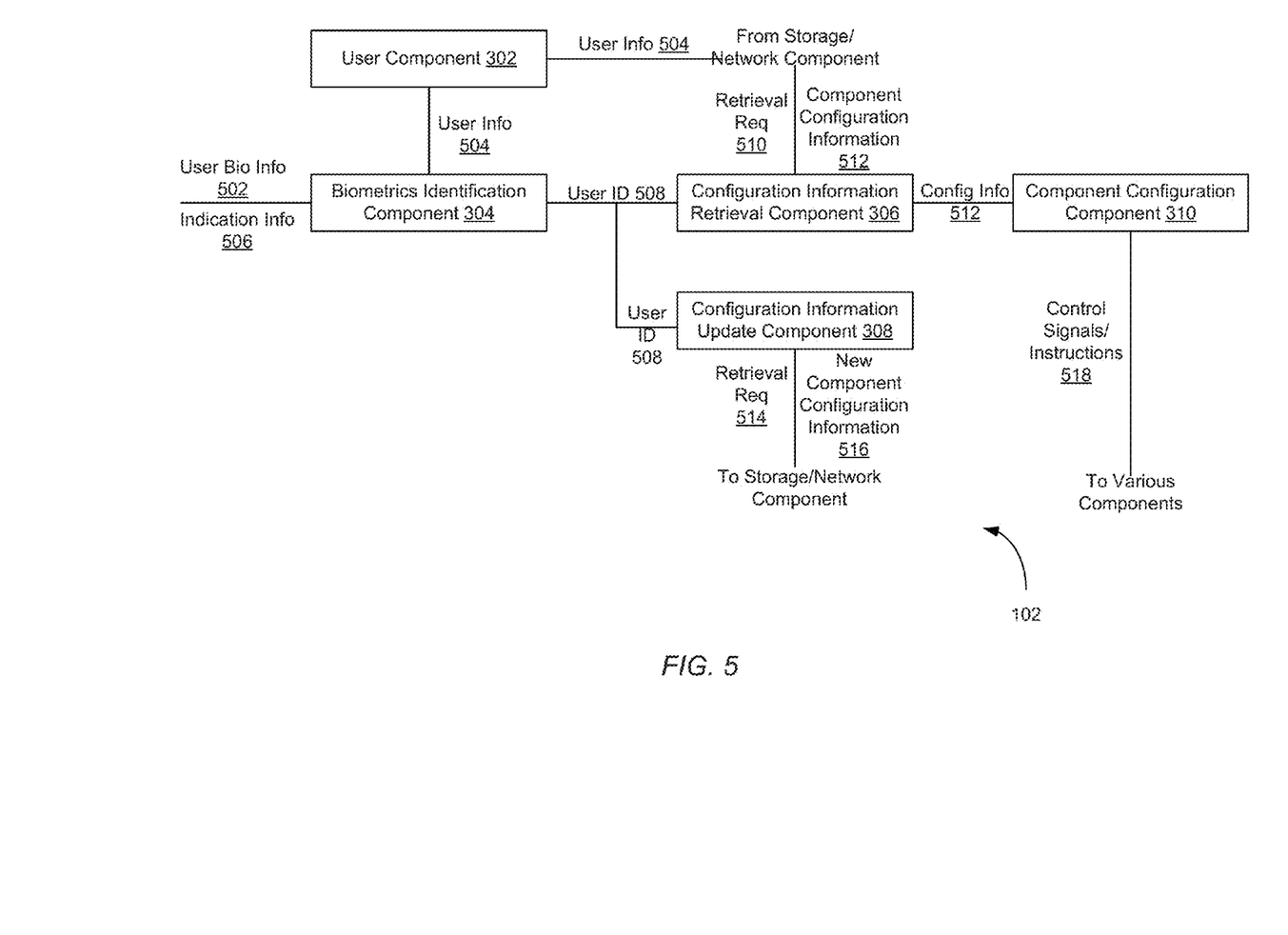
FIG. 5 is a block diagram illustrating an exemplary implementation of the processor shown in FIG. 3.
Figure 6:
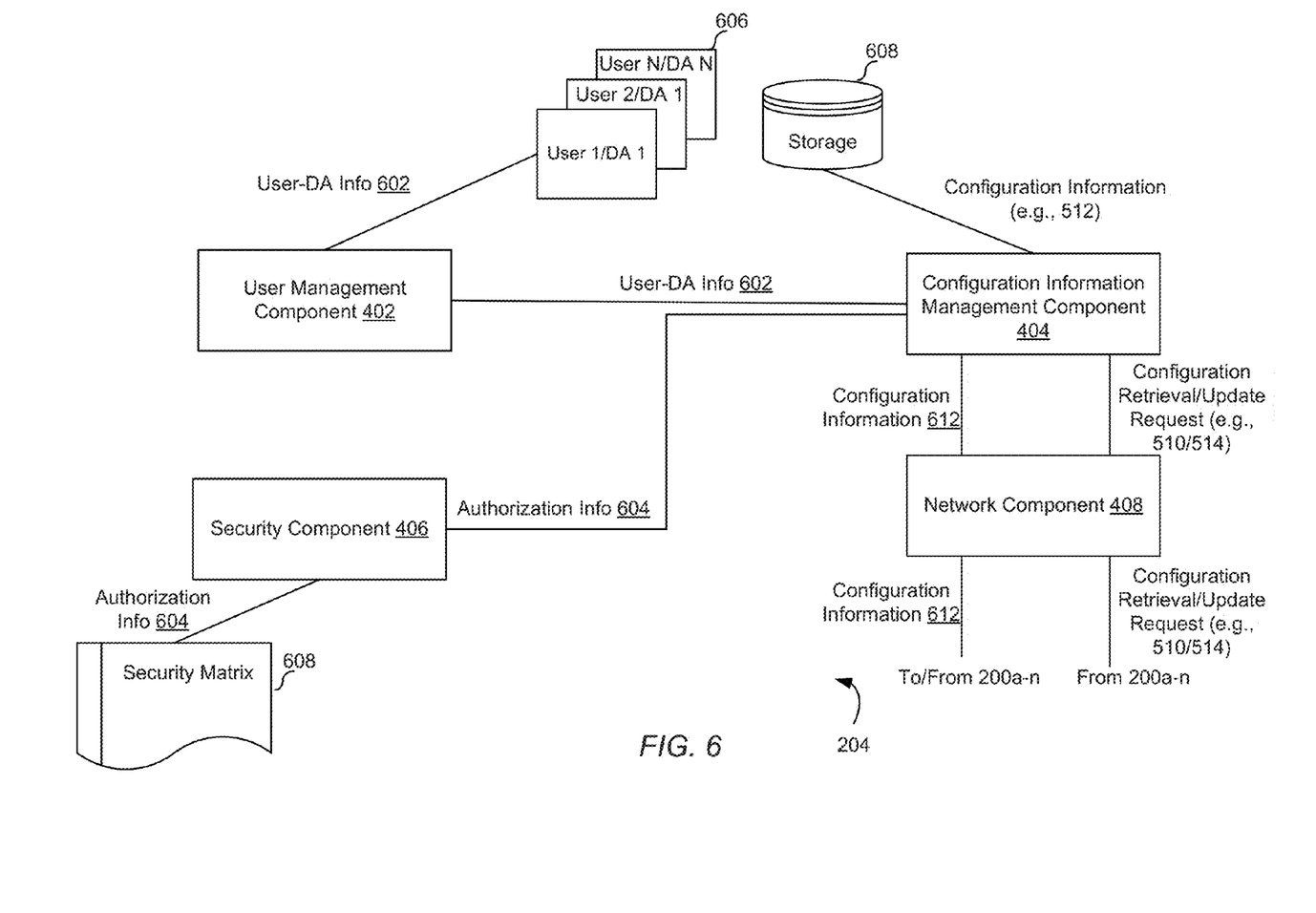
FIG. 6 is a block diagram illustrating an exemplary implementation of the server shown in FIG. 5.

With exemplary implementations of the processor 102 and server 204 in accordance with some examples of the disclosure having been generally described, attention is now directed to FIGS. 5-6. FIG. 5 is a block diagram illustrating further details about the exemplary implementation of the processor 102 shown in FIG. 2 in accordance with one example of the disclosure. As shown, user biometric information 502, e.g., a fingerprint of a particular user can be received by the biometric identification component 304 from biometric information capturing device 104. Based on the user biometric information 502 received, biometric identification component 304 may obtain user information 504 from the user component 302 and determine a user ID associated with the user that provides the biometric metric information 502. As shown, the user component 302 may be configured to provide the user information 504 through a local storage (e.g., a memory device) or through a network component that communicates with one or more remote servers as described and illustrated here.

After the user ID is determined, the biometric identification component 304 may determine whether the user that provided user biometric information 502 has indicated to store personalized settings for one or more customizable components associated with the user or the user has indicated to update the personalized settings. As described above, indication information 506 can be received by the biometric identification component 304 and to enable the biometric identification component 304 to make this determination. For example, the indication information 506 can indicate a time period for which the user has provided the biometrics included in the biometric information 502. For instance, the user may be enabled to provide a long touch on the biometric information capturing device 104 if he/she presses his finger on the biometric information capturing device 104 for longer than 3 seconds. In that example, the indication information 506 may indicate that the user has provided the fingerprint included in the user biometric information 502 for longer than 3 seconds. The indication information 506 can be used by biometric identification component 304 to determine whether the current settings of those customizable components associated with the user are to be stored as personalized settings for that user for those customizable components. In the event that the biometric identification component 304 determines this is the case based on the indication information 506, the biometric identification component 304 transmits the user ID 508 to the configuration information update component 308 to instruct it to update the personalized settings of the customizable components associated with the user with current settings of those customizable components. As shown, in some examples, the configuration information update component 308 may update the local storage with the new configurations 516 for those customizable components. As also shown, in some examples, the configuration information update component 308 may initiate an update request 514 to a remote server, requesting the remote server to update the personalized settings for those customizable components for the first user.

In the event that the biometric identification component 304 determines the indication information 506 indicates the user requests the component configuration information 512 to be retrieved (e.g., a short touch), the biometric identification component 304 transmits the user ID to the configuration information retrieval component 306 to instruct it to retrieve the personalized settings of the customizable components associated with the user. As shown, in some examples, the configuration information retrieval component 306 may retrieve the component configuration information 512 from the local storage. As also shown, in some examples, the configuration information retrieval component 306 may initiate a retrieval request 510 to a remote server, requesting the remote server to retrieve the personalized settings for those customizable components for the first user.

In any event, after retrieving the component configuration information for the user that provided the biometric information, the configuration information retrieval component 306 may transmit the component configuration information 512 to the component configuration component 310. As shown, the component configuration component 310 may generate control signals and/or instructions 518 to instruct various customizable components in accordance with the component configuration information retrieved for the user.

FIG. 6 is a block diagram illustrating further details about the exemplary implementation of the server 204 shown in FIG. 4 in accordance with one example of the disclosure. It will be described with reference to FIG. 4. As shown, the network component 408 can receive configuration retrieval request 510 or update request 514 from individual driving apparatuses 200. The network component 408 can then transmit the request to the configuration information management component 404, which can communicate with the user management component 402 and the security component 406. The request may comprise information indicating an identification of the user for whom the component configuration information 512 is to be retrieved and an identification of the driving apparatus 200 from which the request is initiated. The configuration information management component 404 can pass the user ID and driving apparatus ID in the request to the user management component 402. The user management component 402 can obtain user driving apparatus information 602 using the user ID and driving apparatus ID, which may specify a set of customizable components that are associated with the user for the particular driving apparatus from which the request is initiated. As shown, a set of records 606 can be maintained to keep track of customizable components in a particular driving apparatus for a corresponding user.

The security component 604 can provide authorization information 604 regarding the user's permission to retrieve or update settings for customizable components with the driving apparatus from which the request is initiated. For example, the authorization information 604 may indicate that the user cannot update settings for certain customizable components. As another example, the authorization information 604 may indicate that the user cannot retrieve or update any settings of any customizable components with that particular driving apparatus at all. As shown, a security matrix 608 can be maintained to keep track of individual user's permissions for a corresponding driving apparatus with respect to retrieving and/or updating customizable components in that particular driving apparatus.

Based on the user driving apparatus information 602 and the authorization information 604, the configuration information management component 404 can retrieve or update the component configuration information of the particular driving apparatus for the user. For example, as illustration, the request can be an update request, and the user driving apparatus information 602 can indicate that the user is associated with a set of customizable components in the driving apparatus and the authorization information 604 can indicate that the user has a permission to update any customizable components in the particular driving apparatus. In that example, the configuration information management component 404 can then update the component configuration information for the set of customizable components in the particular driving apparatus stored in the storage 608. As another example, the request can be a retrieval request, and the user driving apparatus information 602 can indicate that the user is associated with the set of customizable components in the driving apparatus and the authorization information 604 can indicate that the user has a permission to retrieve any customizable components in the particular driving apparatus. In that example, the configuration information management component 404 can then retrieve the component configuration information 612 for the set of customizable components in the particular driving apparatus stored in the storage 608 and transmit the component configuration information 612 to the particular driving apparatus. Still as another example, the request can be an update request, and the authorization information indicates that the user does not have a permission to update any customizable components in the particular driving apparatus. In that example, the configuration information management component 404 can deny the request.

Figure 7:
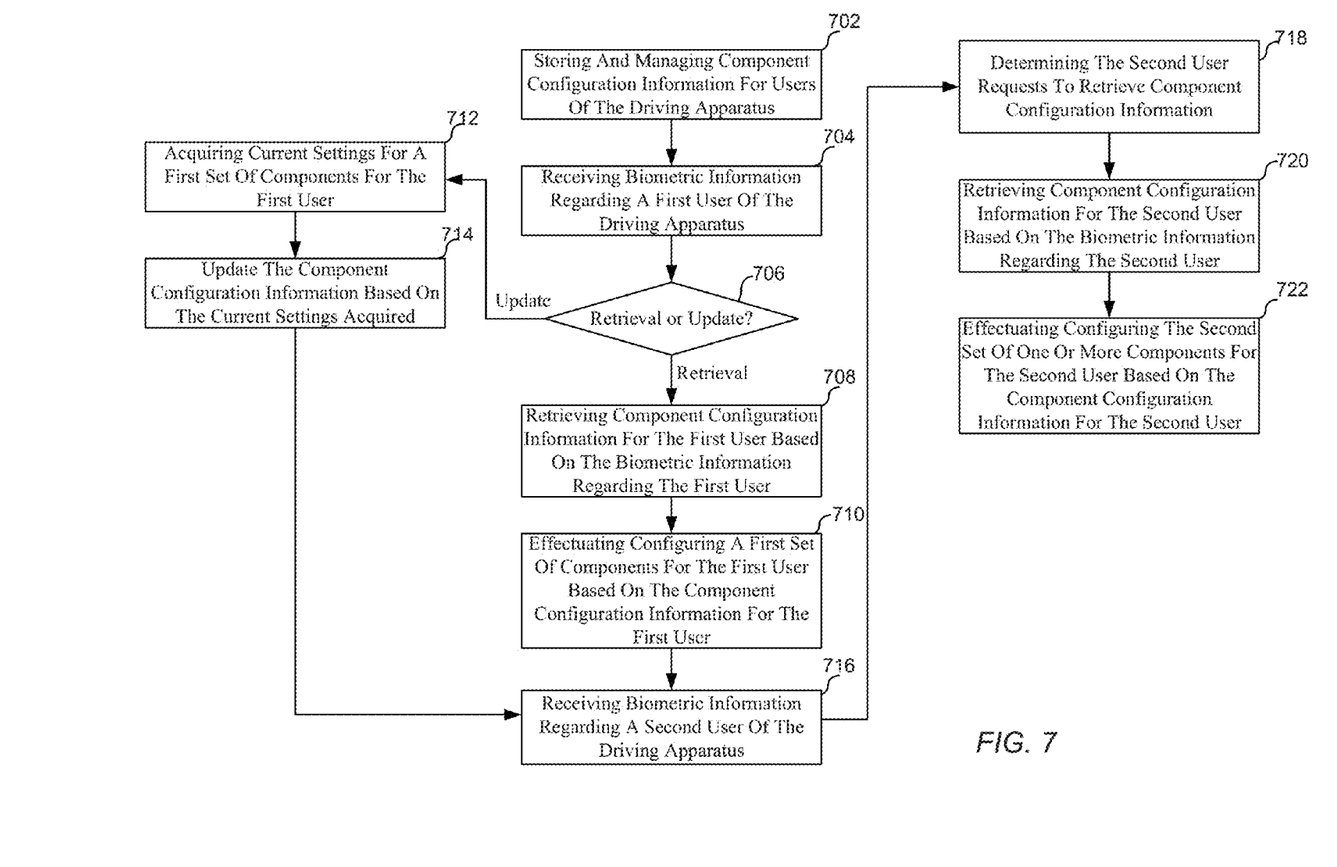
FIG. 7 is a flow chart illustrating an exemplary method for facilitating a user to store, retrieve and/or update personalized setting for a set of customizable components associated with the user in a driving apparatus.

FIG. 7 is a flow chart illustrating an exemplary method for facilitating a user to store, retrieve and/or update personalized setting for a set of customizable components associated with the user in a driving apparatus. It will be described with reference to FIGS. 1-6. The operations of method 700 presented below are intended to be illustrative. In some embodiments, method 700 may be accomplished with one or more additional operations not described and/or without one or more of the operations discussed. Additionally, the order in which the operations of method 700 are illustrated in FIG. 7 and described below is not intended to be limiting.

In some embodiments, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

At 702, component configuration information for multiple users of a driving apparatus can be stored and managed. The component configuration information for a given user stored and managed at block 702 can include personalized settings one or more seats (front and/or rear), one or more seat belts, one or more mirrors, a steering wheel, one or more windows, driving mode of an engine of the driving apparatus (e.g., sports or economy mode), automatic headlight mode (e.g., daytime running mode, tunnel light mode), light intensity on dashboard display(s), airbag mode, cruise control, camera mode, a radio (e.g., start station when the driving apparatus is on, start volume), a navigation system (e.g., language, voice guide volume, voice guide accent), climate control (e.g., personalized start temperature, wind strength, wind direction, humidity, and so on), an entertainment system (e.g., personalized start screen for a particular passenger), and/or any other customizable components in the driving apparatus. The component configuration information for different users stored and managed at 702 can specify different sets of customizable components for different users of the driving apparatus.

Storage and management of aforementioned component configuration information for the users of the driving apparatus can be done via a local storage within the driving apparatus. However, it should be understood this is not necessarily the only case. In some examples, storage and management of aforementioned component configuration information for the users of the driving apparatus can be done via a remote server, such as the server 204 shown in FIG. 2 and described herein. In some examples, block 702 can be implemented by a user component the same as or substantially similar to the user component 302 described and illustrated herein.

At block 704, biometric information regarding a first user of the driving apparatus can be received. Block 704 may involve determining a user ID associated with the first user by analyzing a pattern or patterns in the biometric information received and matching the pattern(s) to verified biometric information regarding the first user. The first user ID can be used to retrieve the component configuration information for the given user. In some examples, block 704 can be implemented by biometric identification component the same as or substantially similar to the biometric identification component 304 described and illustrated herein.

At block 706, a determination whether a retrieval request or an update request can be made. In some examples, block 706 may involve determining indication information indicating the first user requests to retrieve the component configuration information. For example, time period information may be embedded in the biometric information received indicating for how long the first user has provided the biometric information. For instance, the first user may provide his/her fingerprint via a short touch (e.g., 3 second or less) or a long touch (e.g., 3 seconds or longer) on the fingerprint scanner. The time information can be embedded in the biometric information. Based on the time information, block 706 can determine whether a request to retrieve component configuration information for the first user (e.g., a short touch is provided) or to update the component configuration information for the first user (e.g., a long touch is provided). As shown, in the event that decision block 706 determines a retrieval request is initiated, method 700 proceeds to block 708; and in the event that decision block 708 determines an update request is initiated, method 700 proceeds to block 712.

At block 708, component configuration information can be retrieved for the first user based on the biometric information received at 704. In some examples, block 708 can be implemented by a configuration information retrieval component the same as or substantially similar to the configuration information retrieval component 306 described and illustrated herein.

At block 710, configuration of a first set of customizable components can be effectuated for the first user based on the component configuration information retrieved at block 708. In some examples, block 710 can be implemented by a component configuration component the same as or substantially similar to the component configuration component 310 described and illustrated herein.

At block 712, current settings for the first set of components can be acquired for the first user. As mentioned above, after it is determined that an update request is initiated (e.g., as indicated by a long touch on the fingerprint scanner), method 700 proceeds to block 712. The current settings for the first set of components can be acquired and captured at block 712 in a new configuration component information set (e.g., a file). In some examples, block 712 can be implemented by a configuration information update component the same as or substantially similar to the configuration information update component 308 described and illustrated herein.

At block 714, the component configuration information for the first user can be updated based on current settings for the first set of components acquired at block 714. In some examples, block 714 can be implemented by a configuration information update component the same as or substantially similar to the configuration information update component 308 described and illustrated herein.

At block 716, biometric information regarding a second user of the driving apparatus can be received. In some examples, block 716 can be implemented by a biometric identification component the same as or substantially similar to the biometric identification component 304 described and illustrated herein.

At block 718, it can be determined that the second user requests to retrieve component configuration information. In some examples, block 718 can be implemented by a biometric identification component the same as or substantially similar to the biometric identification component 304 described and illustrated herein.

At block 720, component configuration information can be retrieved for the second user based on the biometric information received at 716. In some examples, block 720 can be implemented by a configuration information retrieval component the same as or substantially similar to the configuration information retrieval component 306 described and illustrated herein.

At block 722, configuration of a second set of customizable components can be effectuated for the first user based on the component configuration information retrieved at block 720. In some examples, block 722 can be implemented by a component configuration component the same as or substantially similar to the component configuration component 310 described and illustrated herein.

Implementations of the invention may be made in hardware, firmware, software, or various combinations thereof. The invention may also be implemented as instructions stored on a machine-readable medium, which may be read and executed using one or more processing devices. In one implementation, machine-readable media may include various mechanisms for storing and/or transmitting information in a form that can be read by a machine (e.g., a computing device). For example, machine-readable storage media may include read-only memory, random access memory, magnetic disk storage media, optical storage media, flash memory devices, and other media for storing information, and machine-readable transmission media may include forms of propagated signals, including carrier waves, infrared signals, digital signals, and other media for transmitting information. While firmware, software, routines, or instructions may be described in the above disclosure in terms of specific exemplary aspects and implementations performing certain actions, it will be apparent that such descriptions are merely for the sake of convenience and that such actions in fact result from computing devices, processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. A computer-implemented method for configuring a driving apparatus comprising one or more customizable components, the method comprising:
    storing component configuration information for users of the driving apparatus, wherein the component configuration information including first component configuration information indicating configurations of a first set of customizable components;
    receiving, from a biometric capturing device, first biometric information regarding a first user of the driving apparatus and first indicating information indicating a first duration for which the first user provided biometric information through the biometric capturing device;
    determining the first duration is less than a threshold duration;
    in response to determining the first duration is less than a first threshold duration, retrieving the first component configuration information based on the first biometric information regarding the first user;
    receiving, from the biometric capturing device, second biometric information regarding a second user of the driving apparatus and second indicating information indicating a second duration for which the second user provided biometric information through the biometric capturing device, wherein the second user is distinct and separate from the first user;
    determining the second duration is longer than the threshold duration;
    in response to determining the second duration is longer than the threshold duration, obtaining, from the second user, at least one configuration change for the first set of customizable components; and
    in response to obtaining the at least one configuration change for the first set of customizable components, updating the configurations of the first set of customizable components with the at least one configuration change.

2. The computer-implemented method of claim 1, wherein updating the configurations of the first set of customizable components comprises determining whether the second user is authorized to update configurations of the second set of customizable components.

3. The computer-implemented method of claim 1, wherein the first biometric information regarding the first user includes information indicating at least one of a fingerprint, a voice pattern and a retina pattern of the first user.

4. The computer-implemented method of claim 1, wherein the component configuration information for the users of the driving apparatus is stored in a remote storage over a network, and wherein the first component configuration information for the first user is retrieved from the remote storage over the network.

5. The computer-implemented method of claim 1, wherein the first set of customizable components include at least one of a mirror, a seat, a steering wheel, a climate control, a navigation system, an entertainment system, a window and a light of the driving apparatus.

6. A system configured to facilitate a user to configure and automatically retrieve personalized settings for customizable components in a driving apparatus, the system comprising a processor configured to perform:
    storing component configuration information for users of the driving apparatus, wherein the component configuration information including first component configuration information indicating configurations of a first set of customizable components;
    receiving, from a biometric capturing device, first biometric information regarding a first user of the driving apparatus and first indicating information indicating a first duration for which the first user provided biometric information through the biometric capturing device;
    determining the first duration is less than a threshold duration;
    in response to determining the first duration is less than a first threshold duration, retrieving the first component configuration information based on the first biometric information regarding the first user;
    receiving, from the biometric capturing device, second biometric information regarding a second user of the driving apparatus and second indicating information indicating a second duration for which the second user provided biometric information through the biometric capturing device, wherein the second user is distinct and separate from the first user;
    determining the second duration is longer than the threshold duration;
    in response to determining the second duration is longer than a the threshold duration, obtaining, from the second user, at least one configuration change for the second set of customizable components; and
    in response to obtaining the at least one configuration change for the second set of customizable components, updating the configurations of the first set of customizable components with the at least one configuration change.

7. The system of claim 6, wherein updating the configurations of the first set of customizable components comprises determining whether the second user is authorized to update configurations of the second set of customizable components.

8. The system of claim 6, wherein the first biometric information regarding the first user includes information indicating at least one of a fingerprint, a voice pattern and a retina pattern of the first user.

9. The system of claim 6, wherein the component configuration information for the users of the driving apparatus is stored in a remote storage over a network, and wherein the first component configuration information for the first user is retrieved from the remote storage over the network.

10. The system of claim 6, wherein the first set of customizable one or more configurable components include at least one of a mirror, a seat, a steering wheel, a climate control, a navigation system, an entertainment system, a window and a light of the driving apparatus.

11. The method of claim 1, further comprising:
after retrieving the first configuration information, effectuating configuration of the first set of customizable components using the first configuration information.

12. The method of claim 1, wherein the second set of customizable components comprise at least one component that is not configurable by the first user.

* * * * *